US006075325A

United States Patent [19]
Kouno et al.

[11] Patent Number: 6,075,325
[45] Date of Patent: Jun. 13, 2000

[54] INVERTER AND METHOD FOR DRIVING A PLURALITY OF COLD CATHODE TUBES IN PARALLEL

[75] Inventors: Makoto Kouno; Shuuji Yamaguchi; Yasuhei Shimada, all of Tokyo, Japan

[73] Assignee: NEC Corporation, Tokyo, Japan

[21] Appl. No.: 09/034,311

[22] Filed: Mar. 4, 1998

[30] Foreign Application Priority Data

Mar. 5, 1997  [JP]  Japan ................................. 9-050096

[51] Int. Cl.[7] ................................................ H05B 37/02
[52] U.S. Cl. ........................ 315/307; 315/224; 315/276
[58] Field of Search .................................. 315/224, 291, 315/276, 209 PZ, 307

[56] References Cited

U.S. PATENT DOCUMENTS 5,747,942  5/1998  Ranganath et al. ..................... 315/224
5,854,543  12/1998  Satoh et al. ............................ 315/307

FOREIGN PATENT DOCUMENTS 8-45679  2/1996  Japan .

*Primary Examiner*—David Vu
*Attorney, Agent, or Firm*—Whitham, Curtis & Whitham

[57] ABSTRACT

A drive circuit for a piezoelectric transformer includes a master block 24 having a drive frequency control circuit for controlling the frequency of a drive voltage for a piezoelectric transformer, at least one slave block 25 receiving an output of the above mentioned drive frequency control circuit and having a drive voltage control circuit for controlling a peak value of a drive voltage for a piezoelectric transformer, a circuit for PWM-modulating the drive voltages applied to the piezoelectric transformers, and driving the drive voltages in the same phase, and a circuit for suppressing a harmonic component of a light adjusting frequency included in the drive voltages for the piezoelectric transformers. With this arrangement, when a plurality of cold cathode tubes are driven by using piezoelectric transformer inverters, it is possible to eliminate the limit in the number of tubes lighted and the inclination of the brightness, and to prevent a flickering and the generation of an audible sound.

24 Claims, 15 Drawing Sheets

INVERTER AND METHOD FOR DRIVING A PLURALITY OF COLD CATHODE TUBES IN PARALLEL

BACKGROUND OF THE INVENTION

1. Field of the Invention

The present invention relates to an inverter and a method for driving the same, and more specifically to a circuit and a method for driving a piezoelectric transformer to efficiently and stably light a plurality of cold cathode tubes used as a load and to suppress generation of an audible sound.

2. Description of Related Art

In general, a piezoelectric transformer is a device in which an alternating voltage of a resonance frequency is applied to a primary electrode to cause a mechanical vibration by resonance, and a stepped-up voltage is picked up from a secondary electrode by the mechanical vibration. This piezoelectric transformer has a feature that it can be easily scaled down and thinned in comparison with an electromagnetic transformer, and therefore is attractive for use as a backlight power source for a liquid crystal display. The piezoelectric transformer has a characteristic in which the step-up ratio varies upon the impedance of the load as shown in the step-up characteristics shown in FIG. 9. On the other hand, the cold cathode tube has a characteristic in which a high voltage is required to cause a discharge to start, as shown in FIG. 10. At this time, the impedance of the cold cathode tube viewed from the piezoelectric transformer becomes very large. Thereafter, if a tube current starts to flow as the result of the start of the discharge, the impedance of the cold cathode tube lowers, so that the voltage across the cold cathode tube abruptly drops. However, if the tube current reaches some degree, the drop of the voltage becomes slow. Accordingly, considering the cold cathode tube as a load, the piezoelectric transformer is a device having the characteristics adapted to driving of the cold cathode tube, in which at the time of starting the lighting, a high step-up ratio can be obtained, and if the tube current flows and the lighting becomes stable, the step-up ratio lowers.

In the prior art, as a circuit for driving this type of piezoelectric transformer, a circuit has been known which lights a plurality of cold cathode tube in series as a load for one piezoelectric transformer, as disclosed in Japanese Patent Application Pre-examination Publication No. JP-A-08-045679. This circuit is shown in FIG. 11. This circuit includes an inverter 1 for converting a DC voltage into an AC voltage of a high frequency, a DC power source E for supplying an electric power to the inverter 1, a piezoelectric transformer 2 having primary electrodes receiving the AC voltage and configured that an AC voltage Vo stepped up by a piezoelectric effect is obtained from secondary electrodes 2b, a plurality of series-connected cold cathode tubes 3 connected to the secondary electrodes 2b of the piezoelectric transformer 2 as a load, a resistor R for detecting a tube current Io, a diode D for rectifying the AC voltage, an integrator 4 composed of a smoothing circuit, and a voltage-to-frequency (V-F) converter 5 for controlling a resonance frequency f of the inverter 1 on the basis of the voltage smoothened by the integrator 4.

Now, an operation of the prior art example shown in FIG. 11 will be described. The DC voltage supplied from the DC power source E is converted to the AC voltage by the inverter 1. If the obtained AC voltage having the frequency f is applied to the primary electrodes 2a of the piezoelectric transformer 2, the AC voltage Vo of the frequency f stepped up by the piezoelectric effect is outputted from the secondary electrodes 2b. This AC voltage Vo of the frequency f is supplied to the series-connected cold cathode tubes 3 as the load for the piezoelectric transformer 2. The tube current Io flowing in the load is converted to an AC voltage by the resistor R, and rectified by the diode D, and then, is converted to a smoothened voltage by the integrator 4. On the basis of the voltage smoothened by the integrator 4, the V-F converter 5 controls the resonance frequency f of the inverter 1 and therefore controls the step-up ratio of the piezoelectric transformer, thereby to supply a predetermined tube current Io to the load. By the cold cathode tube driving circuit having the above mentioned circuit construction, a plurality of series-connected cold cathode tubes 3 are lighted in series.

The circuit shown in FIG. 12 includes a piezoelectric transformer 2, a support mechanism 10 for mechanically supporting this piezoelectric transformer 2, a driving circuit 7 for converting a DC voltage into two half-wave sine wave voltages generated alternately, to alternately supply the half-wave sine wave voltages to a pair of primary electrodes 2a of the piezoelectric transformer 2, a DC power supply E for supplying an electric power to the driving circuit 7, a frequency sweep oscillator 6 for controlling the frequency fk of the two half-wave sine wave voltages of the driving circuit 7, a cold cathode tube 3 connected to secondary electrodes 2b of the piezoelectric transformer 2, a load current comparing circuit 8 for comparing the tube current Io flowing in the cold cathode tube 3 with a reference value, for the purpose of controlling a frequency sweep direction of the frequency sweep oscillator 6, and a light adjusting circuit 9 for outputting a light adjusting circuit for driving the piezoelectric transformer 2 in a time-divided manner, to the frequency sweep oscillator 6 and the drive circuit 7.

Now, an operation of the example shown in FIG. 12 will be described. The DC voltage supplied from the DC power source E is converted by the driving circuit 7 into the two half-wave sine wave voltages, which are applied to the pair of primary electrodes 2a of the piezoelectric transformer 2. Thus, the sine wave voltage Vo of a high voltage, stepped up by the piezoelectric effect, is outputted from the secondary electrodes 2b. This sine wave voltage Vo of the high voltage is supplied to the cold cathode tube 3 connected as the load for the piezoelectric transformer 2. The tube current Io flowing in the load is supplied to the load current comparing circuit 8, and is compared with the reference value the inside of the load current comparing circuit 8. If the tube current is smaller than the reference value, the load current comparing circuit 8 outputs a signal for causing the frequency sweep oscillator 6 to lower the frequency fk of the half-wave sine wave voltages outputted from the driving circuit 7. If the tube current is larger than the reference value, the load current comparing circuit 8 outputs a signal for elevating the frequency. The frequency sweep oscillator 6 outputs the drive signal of the frequency fk on the basis of the signal from the load current comparing circuit 8, to the drive circuit 7. The drive circuit 7 drives the piezoelectric transformer 2 by the two half-wave sine wave voltages of the frequency fk. Thus, it is possible to supply a predetermined tube current Io to the load by controlling the drive frequency fk of the piezoelectric transformer 2 to change the step-up ratio of the piezoelectric transformer.

Next, the light adjusting section will be described. The light adjusting circuit 9 oscillates at a frequency fc which is sufficiently lower than the frequency fk of the piezoelectric transformer 2 and which does not give a flicker to eyes, and outputs a binary light adjusting signal having a duty ratio varying upon an inputted light adjusting voltage, to the frequency sweep oscillator 6 and the drive circuit 7. If this light adjusting signal is at a high level, the drive circuit 7 stops the driving of the piezoelectric transformer 2, so as to stop the tube current Io flowing in the load. During the period in which the tube current Io is stopped, the frequency sweep oscillator 6 operates to maintain the drive frequency fk just before the tube current Io is stopped, in order to prevent the drive frequency fk from changing towards a low value by action of the load current comparing circuit 8. This can ensure that when the light adjusting signal is brought to a low level so that the drive circuit 7 restarts to drive the piezoelectric transformer 2 and therefore the tube current Io starts to flow, the tube current does not change.

Operating waveforms in the example shown in FIG. 12 is shown in FIG. 13. The light adjusting signal which is the output of the light adjusting circuit 9 alternately becomes the high level and the low level at the period of the frequency fc. During the high level period, since the outputting of the two half-wave sine wave voltages of the frequency fk, which is the driving voltage of the piezoelectric transformer 2, is stopped, the sine wave voltage Vo of the high voltage and the frequency fk is not outputted from the piezoelectric transformer 2, and therefore, the tube current Io flowing in the load is stopped. In order to maximize the brightness of the cold cathode tube 3, the light adjusting signal is ceaselessly maintained at the low level, and in order to lower the brightness, the high level period of the light adjusting signal is elongated. Thus, the light adjustment is performed by a pulse width modulation (PWM) in which the time period of causing the tube current Io to flow in the cold cathode tube 3 is changed by adjusting the duty ratio of the light adjusting signal which is the output of the light adjusting circuit 9.

In FIG. 12, a plurality of cold cathode tubes 3 used as the load are lighted in parallel by using a plurality of piezoelectric transformer inverters having the above mentioned construction.

However, the prior art disclosed in JP-A-08-034679 shown in FIG. 11 and the example and shown in FIG. 12 have the following problems.

A first problems is that when a plurality of cold cathode tubes 3 are lighted in series as the load for the piezoelectric transformer 2 as shown in FIG. 11, the number of the cold cathode tubes which can be connected in series is limited. Reviewing the characteristics diagram of the mechanical vibration speed "vm" to the output power Pout of the piezoelectric transformer 2 shown in FIG. 14A, it would be seen that the output power Pout of the piezoelectric transformer 2 is substantially in proportion to the mechanical vibration speed "vm". In order to light a plurality of series-connected cold cathode tubes 3, there is required the electric power obtained by multiplying the electric power necessary to drive one cold cathode tube 3 by the number of series-connected cold cathode tubes 3. In order to obtain a large power from the piezoelectric transformer 2, it is necessary to make the mechanical vibration speed "vm" large. However, if the mechanical vibration speed "vm" is made large, the temperature elevation ΔT increases from ambient temperature as shown in FIG. 14B, and the efficiency η lowers as shown in FIG. 14C. In addition, if the mechanical vibration speed "vm" reaches "vm1", the temperature elevation ΔT starts to abruptly increase, and the efficiency η abruptly drops. In other words, in a region higher than the point ΔT1 where the temperature elevation ΔT starts to abruptly increase, and in a region lower than a point η1 where the efficiency η abruptly drops, it cannot be used as a high efficient piezoelectric transformer inverter. Therefore, the output power Pout1 having the temperature elevation ΔT1 and the efficiency η1 can be said to be a limit value of the output power Pout of the piezoelectric transformer 2 in the high efficient piezoelectric transformer inverter. For example, if the cold cathode tube 3 having the tube length 360 mm and tube diameter 3φ is driven with the tube current Io=4.4 mArms by using the piezoelectric transformer 2 having a piezoelectric element of 42 mm in length, 10 mm in width and 1 mm in thickness, the output power limit value Pout1 is 7 W. Since the output power Pout of the piezoelectric transformer 2 in the case of driving one cold cathode tube 2 is 3.5 W, the number of cold cathode tubes which can be series-connected to the piezoelectric transformer 2 is limited to two. As mentioned above, with enlargement of the screen size of the liquid crystal display panel, a plurality of long cold cathode tubes are used in a multi-tube back light, the degree of freedom in the series connection of cold cathode tubes is restricted. Actually, there is no room in selection.

A second problem is that when a plurality of cold cathode tubes are lighted in series as the load for the piezoelectric transformer 2 as shown in FIG. 11, the brightness is uneven. The reason for this is that if a conductive reflecting plate exists near to the cold cathode tubes, a floating capacitance is formed between the cold cathode tubes and the reflecting plate. The current flows into the floating capacitance, with the result that at a high voltage electrode side of the cold cathode tube 3, the tube current value is large and the brightness is high, but at a low voltage electrode side of the cold cathode tube 3, the tube current value is small and the brightness is low. The longer the tube length of the cold cathode tube 3 is, the larger the formed floating capacitance becomes. Therefore, this phenomenon becomes remarkable if a plurality of cold cathode tubes are connected in series.

A third problem is that when a plurality of cold cathode tubes 3 are lighted in parallel as the load for the piezoelectric transformer 2 as shown in FIG. 12, since the respective drive frequencies fk and/or the respective light adjusting frequencies fc are asynchronous, a flickering occurs because of mutual interference of the plurality of cold cathode tubes 3. Since each of the piezoelectric transformer inverters has the frequency sweep oscillator 6, even if variation exists in the step-up characteristics of the piezoelectric transformer 2 shown in FIG. 9 and the voltage-current characteristics of the cold cathode tube 3 shown in FIG. 10, all of the tube currents Io flowing in the respective cold cathode tubes are controlled to a constant value by changing the drive frequencies fk. Therefore, since the drive frequency fk becomes different from one piezoelectric transformer inverter to another, the cold cathode tubes 3 are mutually coupled through the floating capacitance formed between the cold cathode tubes, so that the tube currents Io is amplitude-modulated as shown in FIG. 15. In this condition, if the brightness is lowered by the PWM light adjustment, a flicker occurs when the brightness becomes lower than a certain value. In addition, if the respective light adjusting frequencies fc are out of synchronism with each other, the high voltage at the driving starting time and the driving stopping time of the piezoelectric transformer 2 change the tube current value flowing in another cold cathode tube 3 by means of the mutual coupling of the cold cathode tubes through the floating capacitance. As a result, the operation of the circuit such as the load current comparing circuit 8 and the frequency sweep oscillator 6 for controlling the drive frequency fk in order to maintain the tube current Io at a constant value, is adversely influenced, so that he operation of the inverter becomes unstable.

A fourth problem is that the generation of the audible sound increases when a plurality of long cold cathode tubes are lighted in series as the load for the piezoelectric transformer 2. When the piezoelectric transformer 2 is controlled in the PWM manner for light adjustment, the drive voltage of the piezoelectric transformer 2 becomes a burst form as the drive voltage Vd shown in FIG. 13, and therefore, at the driving starting time and at the driving stopping time, the drive frequency fk includes harmonic components of the light adjusting frequency Fc. If the piezoelectric transformer 2 is driven with the drive voltage Vd of the drive frequency fk including the harmonic components, the vibrating condition of the piezoelectric transformer 2 is momentarily disturbed at the driving starting time and at the driving stopping time, so that this vibration is propagated to the support mechanism 10 of the piezoelectric transformer 2. This becomes the vibration of the piezoelectric transformer 2 and the support mechanism 10, so that the audible sound occurs. Even if the generation of the audible sound is low in the case of driving a long cold cathode tube 3, when a plurality of long cold cathode tubes 3 are driven in series, since the discharge start voltage and the tube voltage for the long cold cathode tubes to be lighted become high, the mechanical vibration speed "vm" of the piezoelectric transformer 2 increases, and therefore, the audible sound is apt to easily occur.

SUMMARY OF THE INVENTION

Accordingly, it is an object of the present invention to provide an inverter and a method for driving the same, which has overcome the above mentioned problems of the prior art.

Another object of the present invention is to provide a circuit and a method for driving a piezoelectric transformer, for efficiently and stably lighting a plurality of cold cathode tubes, by synchronizing driving frequencies and light adjusting frequencies of a plurality of inverters.

Still another object of the present invention is to provide a circuit and a method for driving a piezoelectric transformer in an inverter for lighting a plurality of cold cathode tubes, for preventing generation of an audible sound which becomes a problem in the PWM type light adjustment.

According to a first aspect of the present invention, there is provided an inverter driving method for driving in parallel a plurality of inverters each including a drive means for converting a DC voltage into an AC voltage and a step-up means outputting from a secondary side an AC voltage obtained by stepping up an AC voltage applied to a primary side, the primary side of the step-up means being driven with the AC voltage of the drive means, and a load being driven by the AC voltage outputted from the secondary side of the step-up means, wherein the AC voltage outputted from the secondary side of the step-up means is controlled at a constant value, and respective drive frequencies of the inverters are controlled to have the same value.

According to a second aspect of the present invention, there is provided an inverter driving method for driving in parallel a plurality of inverters each including a drive means for converting a DC voltage into an AC voltage and a step-up means outputting from a secondary side an AC voltage obtained by stepping up an AC voltage applied to a primary side, the primary side of the step-up means being driven with the AC voltage of the drive means, and a load being driven by the AC voltage outputted from the secondary side of the step-up means, wherein the AC voltage outputted from the secondary side of the step-up means is controlled at a constant value, the AC voltage supplied to the load is controlled in a PWM manner, and outputting periods of the AC voltages outputted from respective step-up means of the inverters are controlled in the same phase.

In this case, respective drive frequencies of the inverters can be controlled to have the same value.

According to a third aspect of the present invention, there is provided a piezoelectric transformer driving circuit comprising:

a first inverter including a first drive circuit for converting a DC voltage into an AC voltage, a first piezoelectric transformer outputting from a secondary electrode an AC voltage obtained by stepping up an AC voltage applied to a primary electrode by means of a piezoelectric effect, a frequency sweep oscillator for outputting a drive frequency for the first piezoelectric transformer to the first drive circuit, a first load current comparing circuit for comparing whether a current flowing in a first load connected to the first piezoelectric transformer is large or small, the drive frequency of the frequency sweep oscillator being controlled by a control signal outputted from the first load current comparing circuit so as to control the AC current value of the first load at a constant value; and at least one second inverter including a second drive circuit receiving the drive frequency outputted from the frequency sweep oscillator, a second piezoelectric transformer connected to the second drive circuit, a second load current comparing circuit for comparing whether a current flowing in a second load connected to the second piezoelectric transformer is large or small, and a drive voltage control circuit for changing the drive voltage for the second piezoelectric transformer, outputted from the second drive circuit, the drive voltage control circuit being controlled by a control signal outputted from the second load current comparing circuit so as to control the AC current value of the second load at a constant value.

A preferred embodiment further includes a light adjusting circuit for outputting to the frequency sweep oscillator and an envelope generator, a signal for modulating the drive voltage for the first and second piezoelectric transformers in a PWM manner, and the envelope generator for outputting to the first drive circuit and the drive voltage control circuit, a signal for suppressing a harmonic component caused by a time-divided manner, included in the frequency component of the drive frequency supplied from the light adjusting circuit. Furthermore, the preferred embodiment can include a means for synchronizing the drive frequencies for a plurality of piezoelectric transformers, a means for modulating the drive voltages for the plurality of piezoelectric transformers, in a PWM manner and in the same phase, a means for controlling the tube current at a constant by controlling a peak value of the drive voltages for the piezoelectric transformers, and a means for modulating the envelope of the drive voltages for the piezoelectric transformers into a trapezoidal form.

In the piezoelectric transformer drive circuit in accordance with the present invention, all the drive frequencies for the piezoelectric transformers are synchronized. Therefore, it is possible to prevent the amplitude modulation of the tube currents caused by the coupling given by floating capacitances between cold cathode tubes, and therefore, to prevent generation of flickering in the cold cathode tubes. Since all the light adjusting frequencies in the PWM light adjusting manner are also synchronized, a high voltage at the drive starting time and at the drive stopping time of the piezoelectric transformer, is prevented from changing the tube current value flowing in another piezoelectric transformer, because of the coupling given by floating capacitances between cold cathode tubes. Therefore, the inverter operation is prevented from becoming unstable, and generation of the flickering is avoided. Furthermore, in the slave block, the peak value of the drive voltage for the piezoelectric transformer is controlled to control the tube current at a constant. Therefore, it is possible to synchronize all the drive frequencies while lighting all the cold cathode tubes at the same brightness. In addition, the envelope of the drive voltages for the piezoelectric transformers is modulated into a trapezoidal form at the light adjusting time. Therefore, it is possible to reduce the increase of an audible sound which becomes a problem when a plurality of cold cathode tube having a long tube length are lighted in parallel.

DESCRIPTION OF THE PREFERRED EMBODIMENTS

Figure 1:
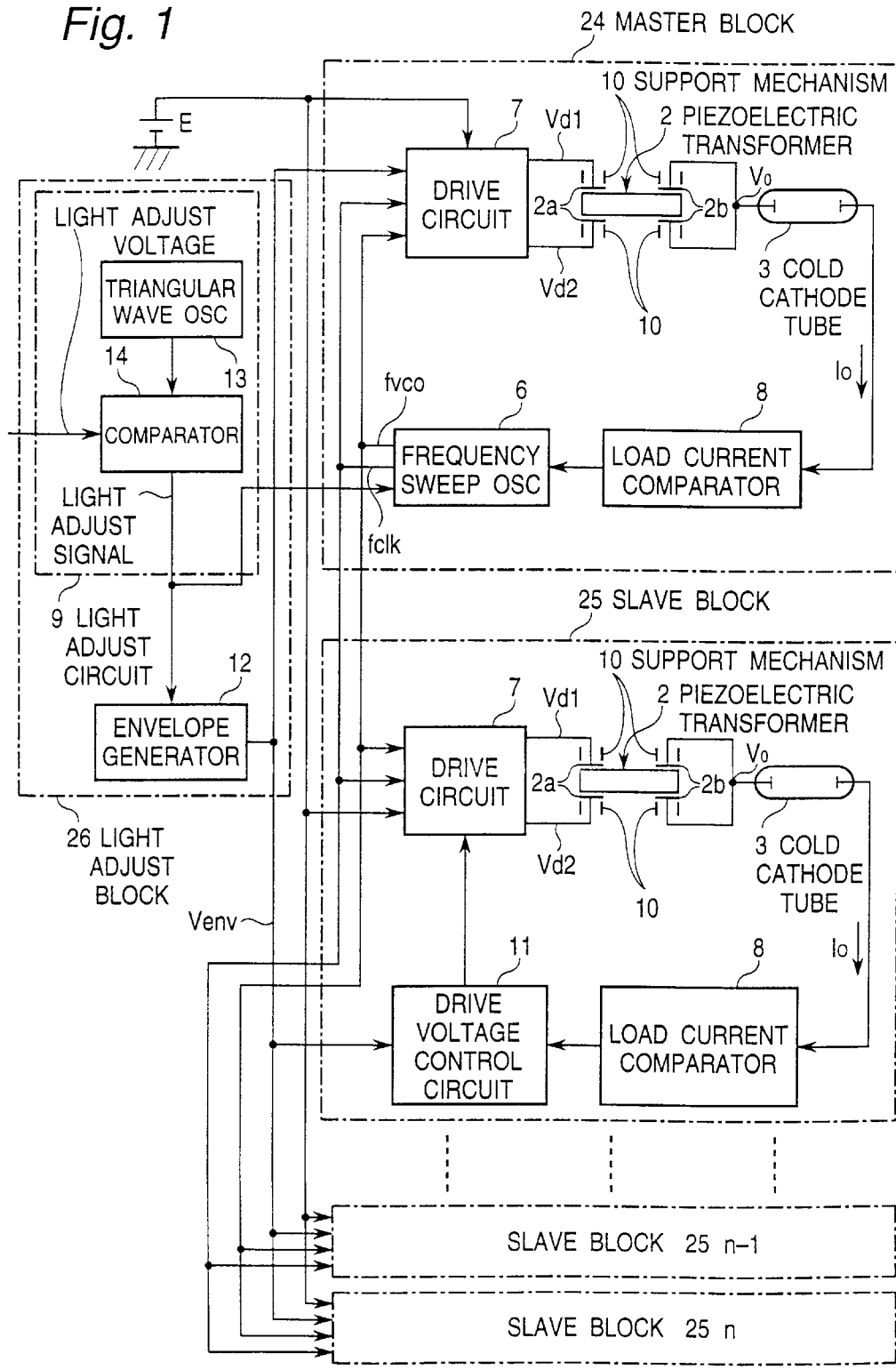
FIG. 1 is a block diagram of one embodiment of the piezoelectric transformer driving circuit in accordance with the present invention.

Now, embodiments of the present invention will be described with reference to the drawings. FIG. 1 is a block diagram of one embodiment of the piezoelectric transformer driving circuit in accordance with the present invention. The circuit is generally constituted of a master block 24, slave blocks 25 and a light adjusting block 26.

Figure 3:
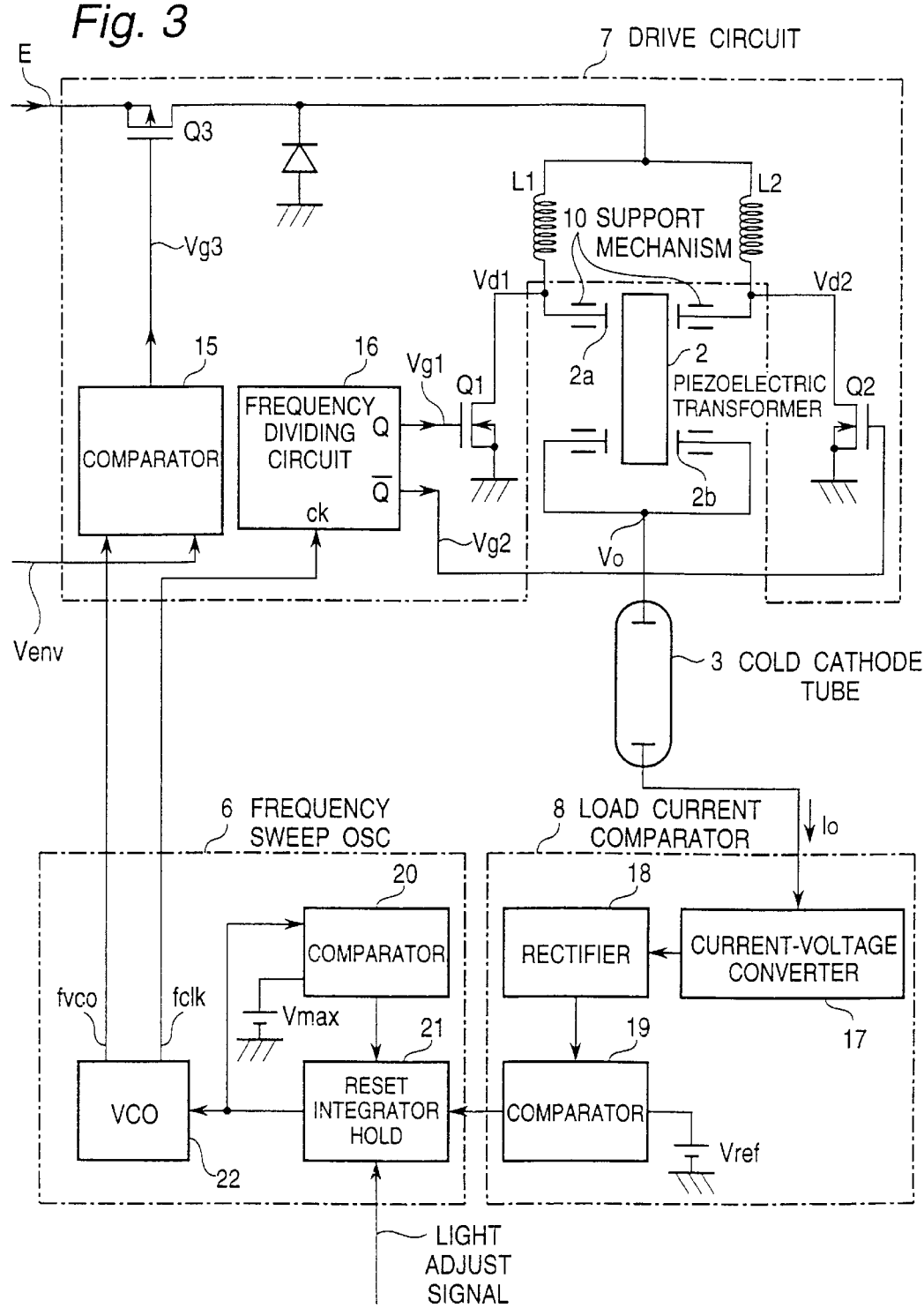
FIG. 3 is a block diagram of the master block in the embodiment shown in FIG. 1.

As shown in FIG. 3, the master block 24 includes a first piezoelectric transformer 2 having primary electrodes 2a receiving an input AC voltage and secondary electrodes 2b for outputting a stepped-up AC voltage, a first cold cathode tube 3 connected to the secondary electrodes of the first piezoelectric transformer 2, a first driving circuit 7 for converting a DC voltage into two half-wave sine wave voltages generated alternately, to alternately supply the half-wave sine wave voltages to both the primary electrodes 2a of the first piezoelectric transformer 2, a frequency sweep oscillator 6 for controlling the drive frequency fk of the first driving circuit 7, and a first load current comparing circuit 8 for generating on the basis of the tube current Io flowing in the first cold cathode tube 3, a signal for controlling a frequency sweep direction of the frequency sweep oscillator 6. The tube current Io flowing in the first cold cathode tube 3, supplied to the first load current comparing circuit 8, is converted to an AC voltage by a first current-voltage converter 17, and furthermore, converted into a DC voltage by a first rectifier 18. Then, this DC voltage is compared with a reference voltage Vref corresponding to a predetermined value of the tube current Io by a first comparator. An output signal of the first comparator 19 outputted to the frequency sweep oscillator 6 is a signal for elevating the drive frequency fk for the first piezoelectric transformer 2 when the DC voltage obtained from the tube current Io is larger than the reference voltage Vref. On the other hand, when the DC voltage is smaller than the reference voltage Vref, the first comparator 19 outputs a signal for lowering the drive frequency fk. The frequency sweep oscillator 6 converts the binary output signal of the first comparator 19 into an analog signal by an integrator 21, and outputs the analog signal to a VCO (voltage controlled oscillator) 22 and a comparator 20.

The VCO 22 oscillating at a frequency corresponding to the analog output signal, is an oscillating circuit for outputting a frequency which is a double of the drive frequency fk. This oscillating frequency becomes low if the output voltage of the integrator 21 becomes high. However, the comparator 20 compares the output voltage of the integrator 21 with a reference voltage Vmax. When the output voltage exceeds the reference voltage Vmax, namely, when the oscillating frequency drops to a minimum frequency determined by the reference voltage Vmax, the comparator 20 outputs a reset signal to the integrator 21 so as to cause to sweep the oscillating frequency of the VCO 22 from a minimum frequency to a maximum frequency at a high speed. The VCO 22 generates two signals, namely a triangular wave signal fvco and a rectangular wave signal fclk in the frequency range from the minimum frequency to the maximum frequency. The triangular wave signal fvco and the rectangular wave signal fclk outputted from the VCO 22 are supplied to the first drive circuit 7. In the first drive circuit 7, the rectangular wave signal fclk outputted from the VCO 22 is frequency-divided by a first frequency dividing circuit 16, so that two signals having the duty ratio of 50%, different in phase. These two signals are supplied to first transistors Q1 and Q2, respectively, so that the transistors Q1 and Q2 are alternately turned on. When one of the transistors Q1 and Q2 is turned on, a current energy is stored in a first coil L1 or L2 connected to the turned-on transistor, and when the same transistor is turned off, the stored current energy is discharged by a series resonance of the first coil and an input capacitance of the first piezoelectric transformer 2. Thus, two half-wave sine wave voltages Vd1 and Vd2 different in phase are generated. These half-wave sine wave voltages are alternately applied to both the primary electrodes 2a of the first piezoelectric transformer 2, with the result that the half-wave sine wave voltages equivalently functions as a sine wave voltage. The first piezoelectric transformer 2 outputs from the secondary electrodes 2b the output voltage Vo determined by the step-up ratio in accordance with the drive frequency fk and the impedance of the first cold cathode tube 3, so that the first cold cathode tube 3 is lighted.

Figure 4:
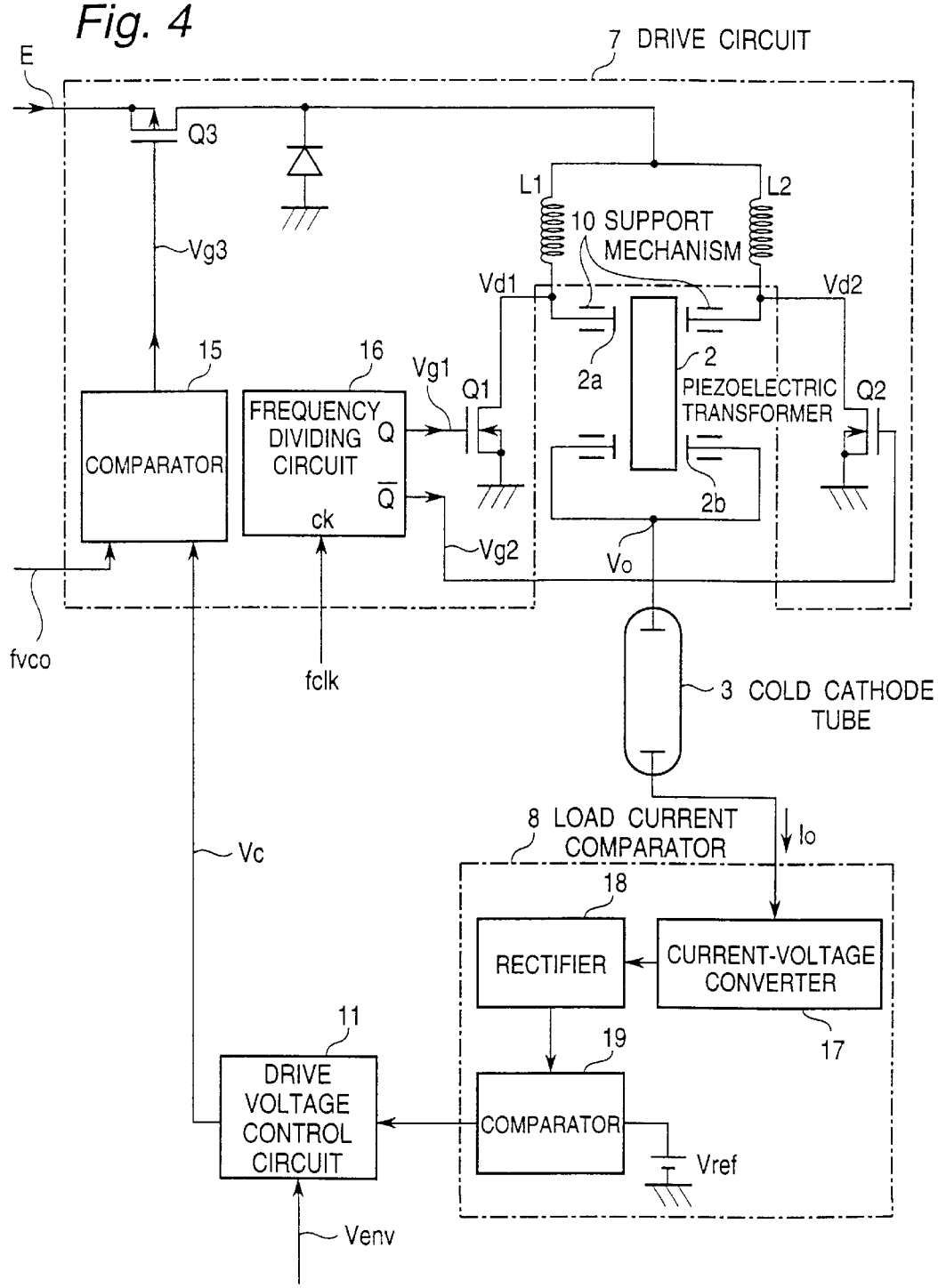
FIG. 4 is a block diagram of the slave block in the embodiment shown in FIG. 1.
Figure 5:
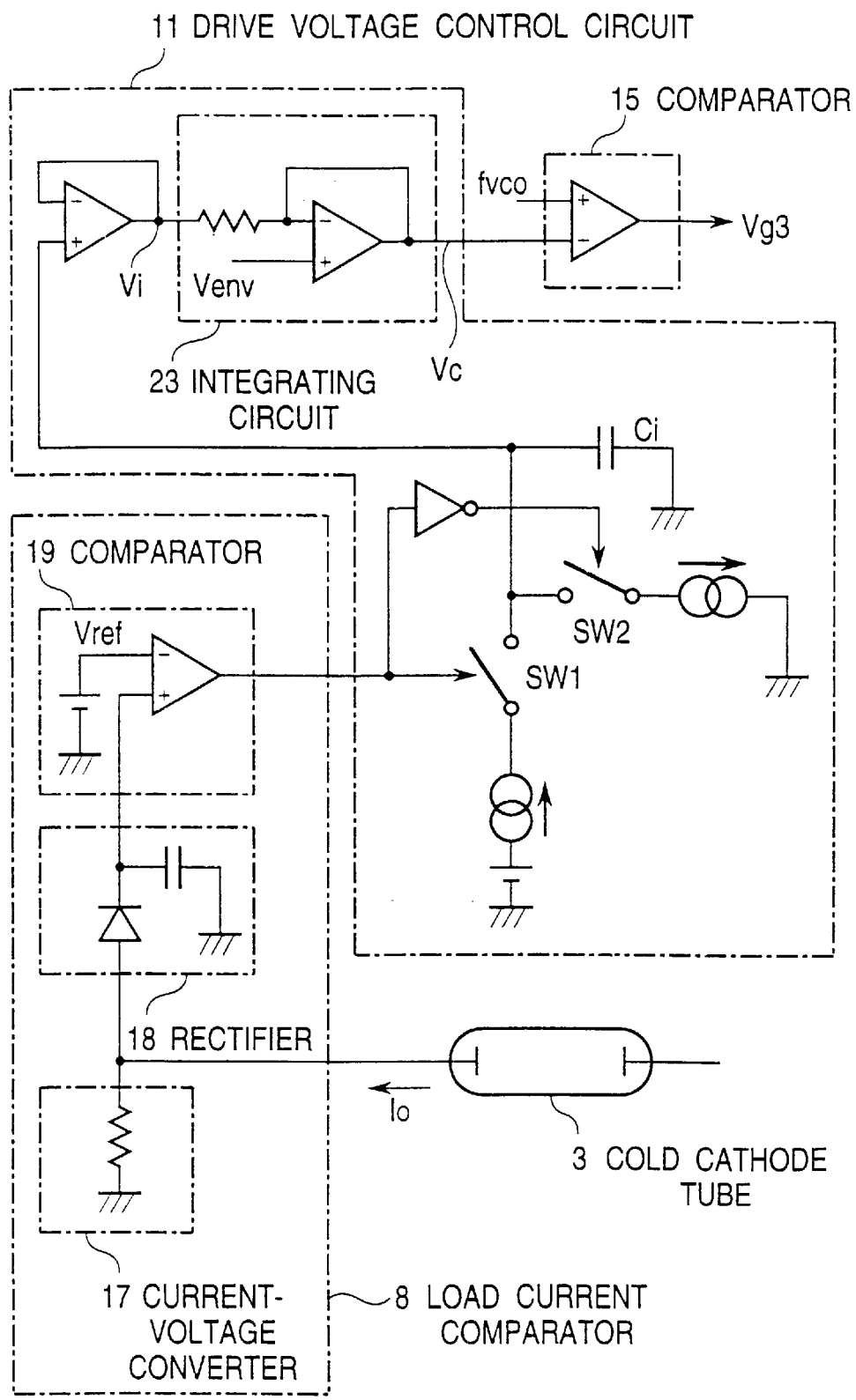
FIG. 5 is a block diagram of the drive voltage control circuit in the embodiment shown in FIG. 1.

Next, the slave block 25 will be described with reference to FIG. 4. It includes a second piezoelectric transformer 2, a second cold cathode tube 3, a second drive circuit 7, a second load current comparing circuit 8 and a drive voltage control circuit 11 for outputting a signal controlling the voltage peak value of the two half-wave sine wave voltages outputted from the second drive circuit 7. The second load current comparing circuit 8 has the same construction as that of the first load current comparing circuit 8, and therefore, outputs a binary signal indicative of whether the tube current Io flowing in the second cold cathode tube 3 is larger or smaller than a predetermined value determined by a second reference voltage Vref. This binary signal is supplied to the second drive circuit 7. Since this second drive circuit 7 has the same construction as that of the first drive circuit 7, the second drive circuit 7 generates two second half-wave sine wave voltages Vd1 and Vd2 different in phase, for driving the second piezoelectric transformer 2. The output signal Vc of the drive voltage control circuit 11 supplied to the second drive circuit 7, is inputted to a second comparator 15, and is compared with the triangular wave fvco supplied from the VCO22 of the first frequency sweep oscillator 6. This second comparator 15 outputs a signal for controlling a second transistor Q3. The ratio of an on-period and an off-period of the second transistor Q3 is changed by the output signal of the comparator 15, so that the current value supplied to the coils L1 and L2 are controlled so as to control the peak value of the second half-wave sine wave voltages Vd1 and Vd2 for driving the second piezoelectric transformer 2. An example of an internal circuit of the drive voltage control circuit 11 is shown in FIG. 5. For example, when the tube current Io flowing in the second cold cathode tube 3 becomes larger than the predetermined value, a high level signal is outputted from the second comparator 19 of the second load current comparing circuit 8. In response to this high level signal, a switch SW1 is turned on and a switch SW2 is turned off, so that a capacitor Ci is charged from a constant current source, and therefore, a voltage Vi of the capacitor Ci is increased. This voltage Vi is supplied to an inverted input of an integrator 23 having a non-inverted input receiving an output signal Venv of an envelope generator 12. This signal Venv is at a high level when the cold cathode tube 3 is lighted. When the voltage Vi of the capacitor Ci becomes higher than Venv, the output Vc of the integrator 23 lowers. This output Vc is supplied to an inverted input of the second comparator 15 of the second drive circuit 7, and is compared with the triangular wave fvco which is outputted from the VCO 22 of the frequency sweep oscillator 6 and which is supplied to a non-inverted input of the second comparator 15. When the output Vc of the integrator 23 lowers, the second comparator 15 outputs a signal for increasing the off period of the transistor Q3. To the contrary, if the tube current Io becomes smaller than the predetermined value, the second comparator 19 outputs a low level signal. In response to this low level signal, the switch SW1 is turned off and the switch SW2 is turned on, so that the capacitor Ci is discharged through a constant current source, and therefore, the voltage Vi of the capacitor Ci decreases. When this voltage Vi becomes smaller than Venv, the output Vc of the second integrator 23 elevates. If the output Vc of the second integrator 23 elevates, the second comparator 15 outputs a signal for increasing the on period of the transistor Q3.

Figure 7:
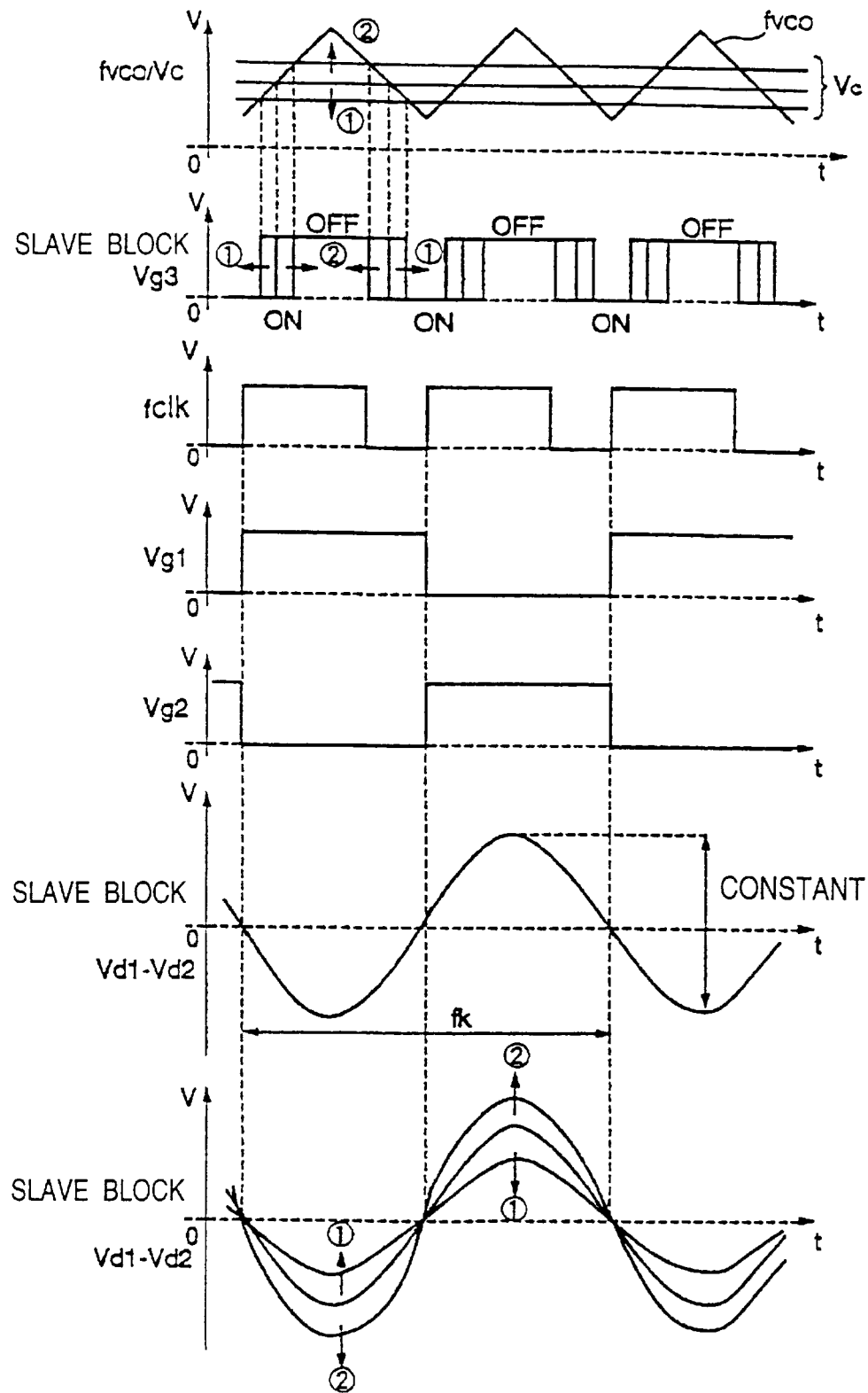
FIG. 7 is a waveform diagram for illustrating the drive voltage controlling operation of the embodiment of the piezoelectric transformer driving circuit in accordance with the present invention.

This operating waveform is shown in FIG. 7. The tube current Io flowing in the second cold cathode tube 3 is controlled to a predetermined current value by controlling the peak value of the two second half-wave sine wave voltages Vd1 and Vd2. Incidentally, the frequency of the second two half-wave sine wave voltages Vd1 and Vd2 is in synchronism with the first two half-wave sine wave voltages Vd1 and Vd2, since the rectangular wave signal fclk outputted from the VCO 22 of the frequency sweep oscillator 6 is supplied to the frequency-divider 16 of the second drive circuit 7. In addition, a plurality of slave blocks 25 are connected in parallel as shown in FIG. 1, and therefore, "n" cold cathode tubes 3 can be lighted.

Next, the light adjusting block 26 will be described. In FIG. 1, the light adjusting block 26 includes a light adjusting circuit 9 for outputting to the frequency sweep oscillator 6 and the envelope generator 12 a light adjusting signal for intermittently controlling the first and second piezoelectric transformers 2 by a light adjusting frequency fc, and envelope generator 12 for outputting the first drive circuit 7 and the drive voltage control circuit 11, a signal for suppressing harmonic components which are generated by the intermittent controlling and which are included in the frequency component of the drive voltages Vd1 and Vd2 for the piezoelectric transformer 2. The light adjusting circuit 9 includes a triangular wave oscillator 13 for generating a frequency which is sufficiently smaller than the drive frequency fk and does not cause a flickering and a comparator 14 for comparing the triangular wave outputted from the triangular wave oscillator 13, with a light adjusting voltage, so as to determine the duty ratio of the light adjusting signal. When the light adjusting voltage is larger than the triangular wave, the light adjusting signal outputted from the light adjusting circuit 9 is ceaselessly at the low level. The ratio of the high level period of the light adjusting signal gradually increases with the lowering of the light adjusting voltage. This light adjusting signal is supplied to the integrator 21 (FIG. 3) of the frequency sweep oscillator 6. When the light adjusting signal is at the high level, namely, during the period for stopping the driving of the piezoelectric transformer 2, the analog signal outputted from the integrator 21 is held not to change even if the tube current Io of the first cold cathode tube 3 lowers. Therefore, the frequency generated in the VCO 22 does not change, and when the driving of the first piezoelectric transformer 2 is restarted, the piezoelectric transformer 2 can be driven with the same frequency as that just before the driving is stopped.

Figure 6:
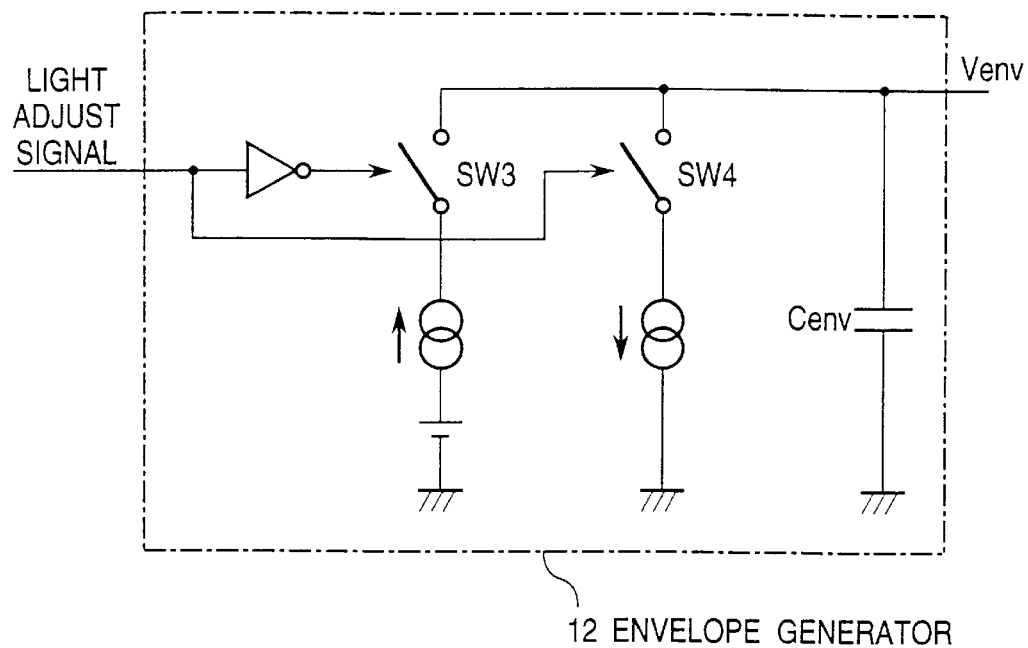
FIG. 6 is a block diagram of the envelop generator in the embodiment shown in FIG. 1.
Figure 8:
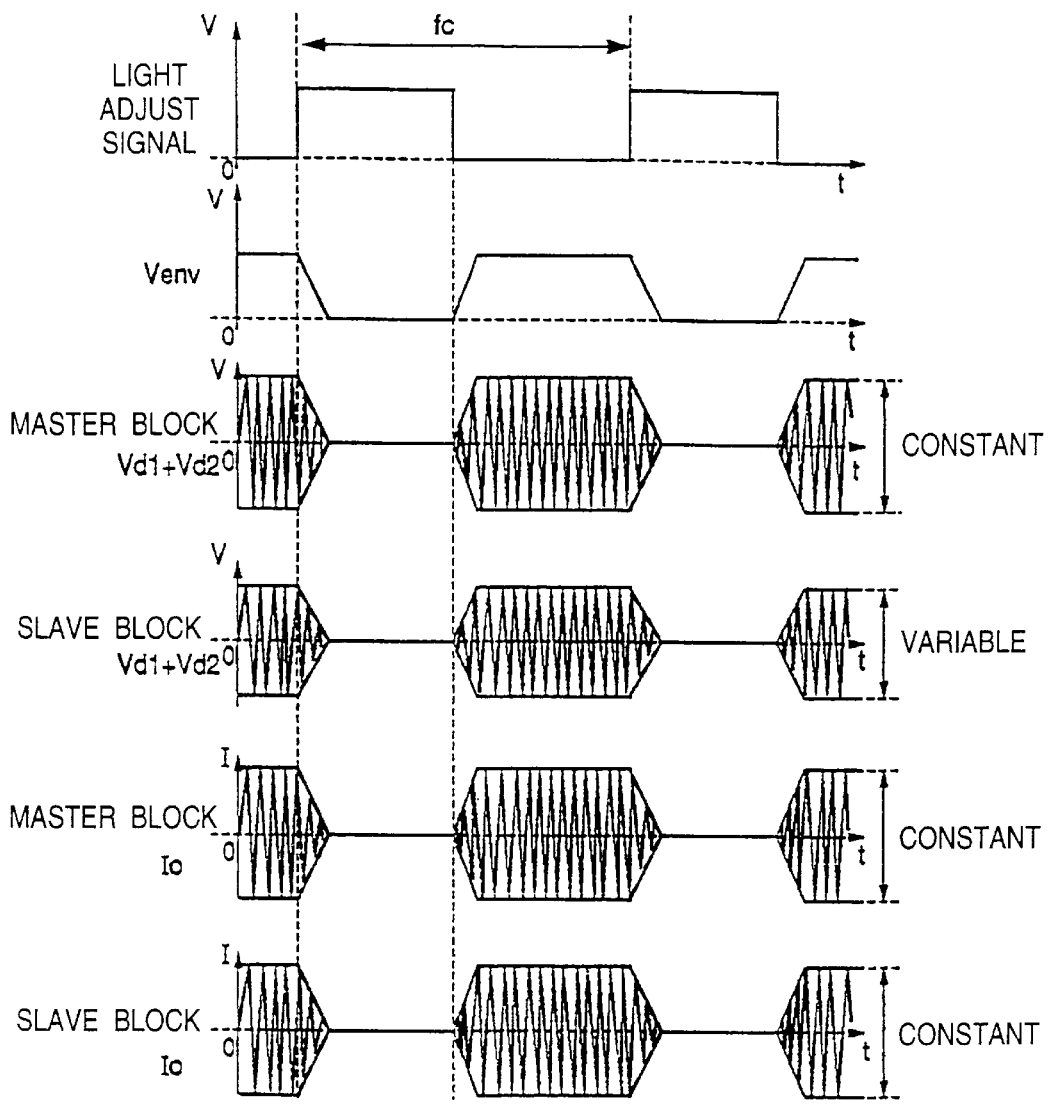
FIG. 8 is a waveform diagram for illustrating the light adjusting operation of the embodiment of the piezoelectric transformer driving circuit in accordance with the present invention.
Figure 9:
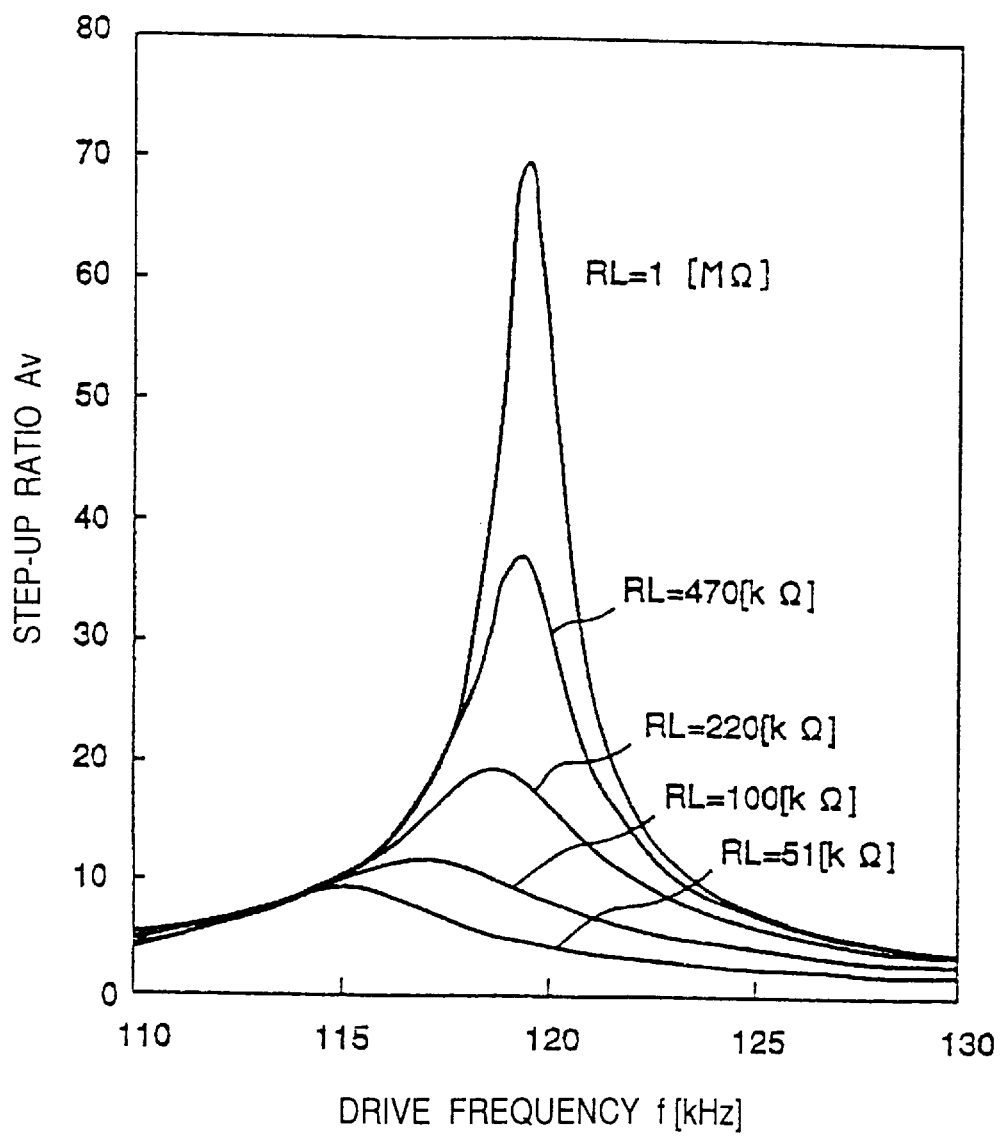
FIG. 9 is the step-up characteristics diagram of the piezoelectric transformer.
Figure 10:
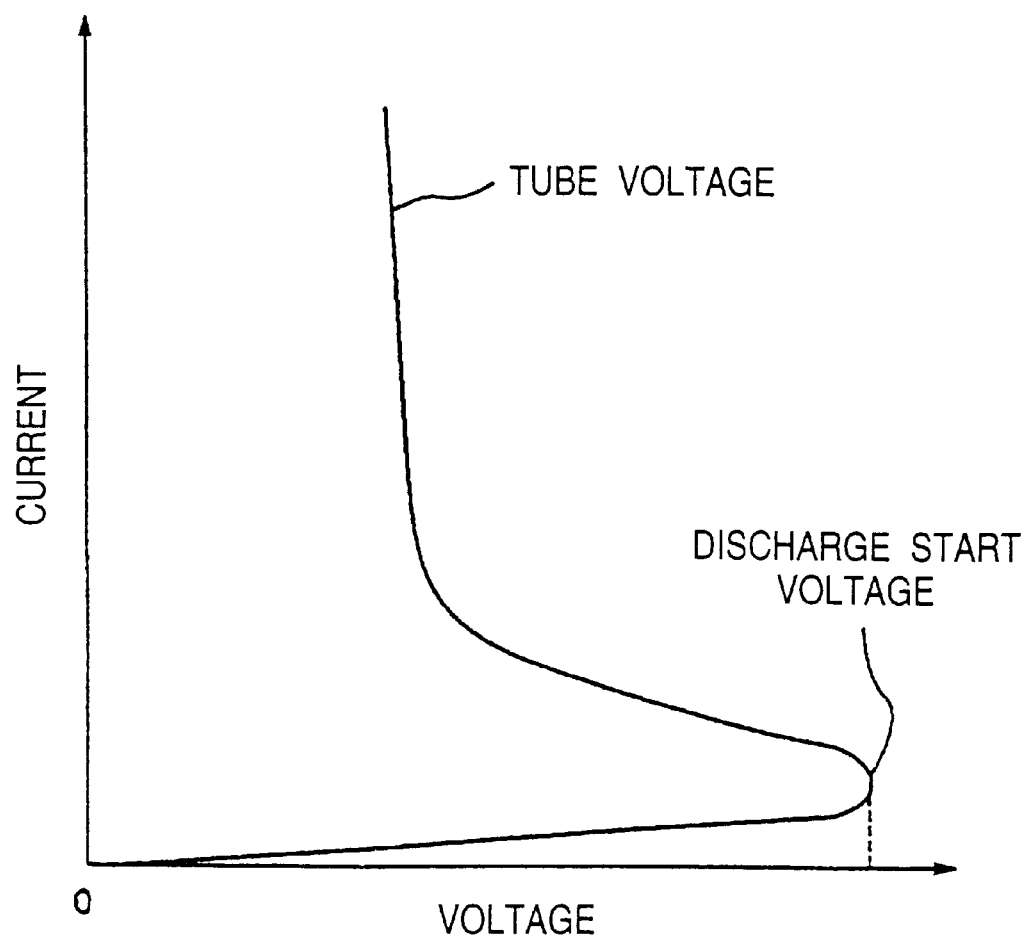
FIG. 10 is the voltage-current characteristics diagram of the cold cathode tube.
Figure 11:
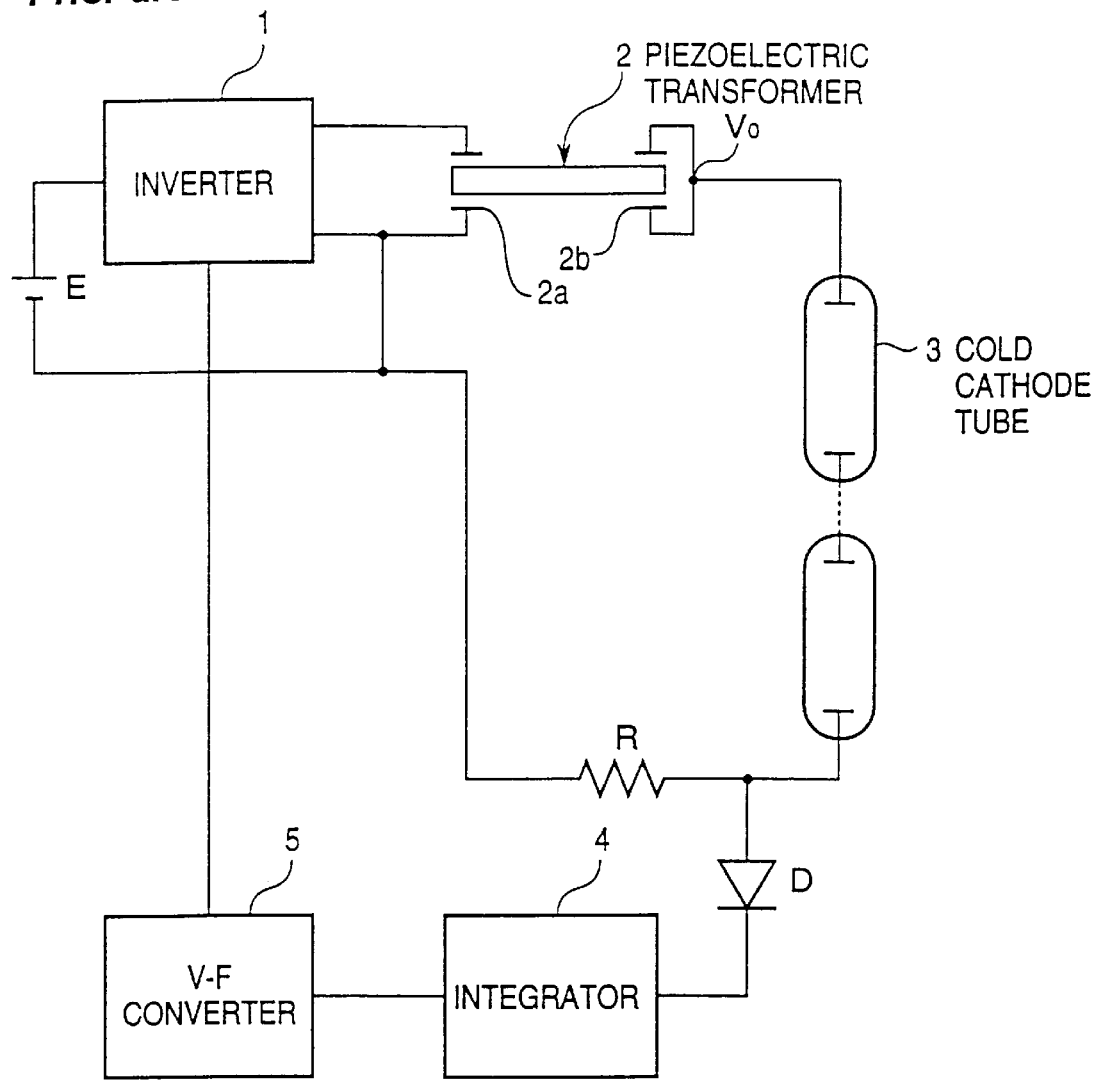
FIG. 11 is a block diagram of the prior art piezoelectric transformer driving circuit for lighting a plurality of cold cathode tubes in series.
Figure 12:
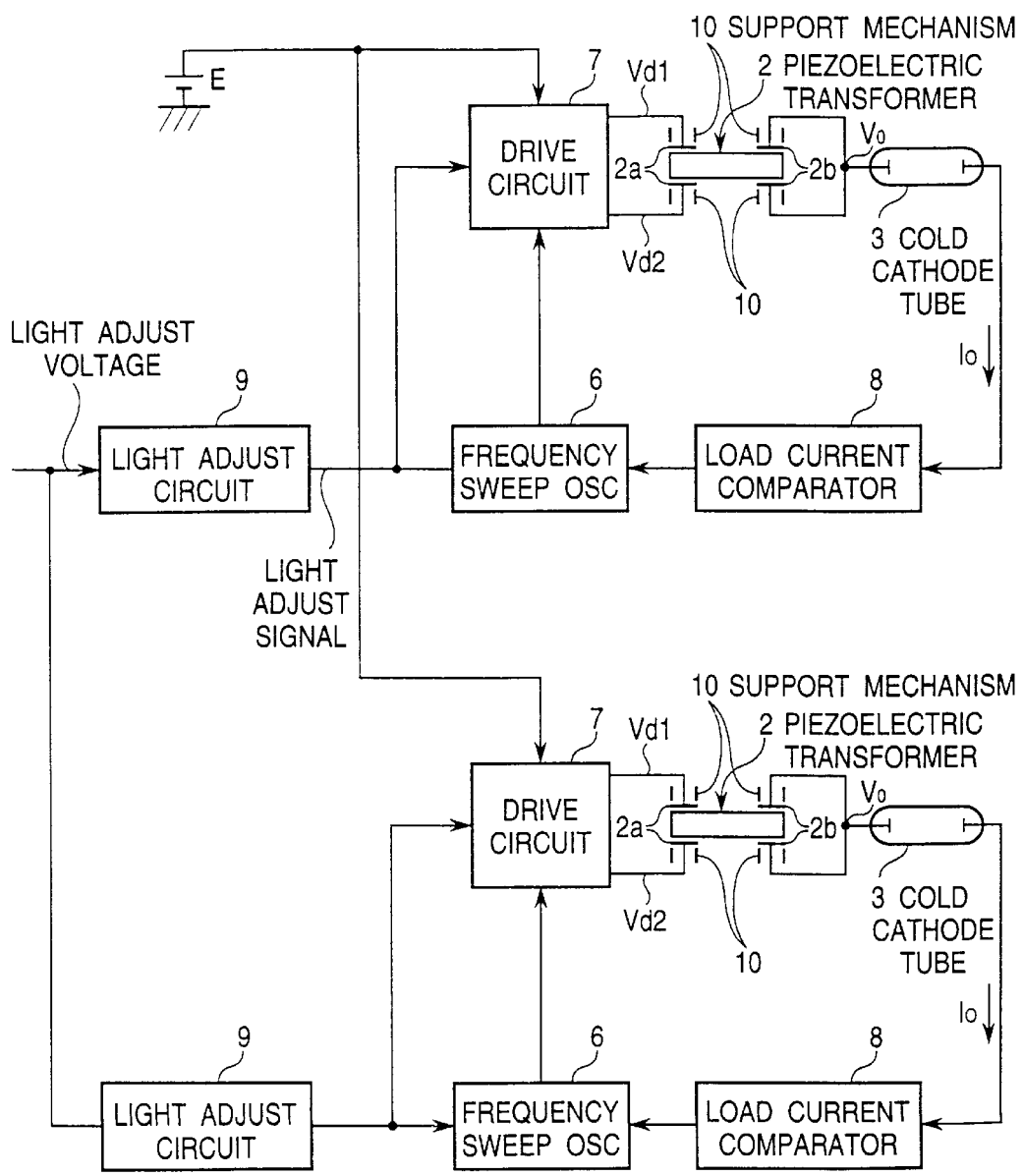
FIG. 12 is a block diagram of the piezoelectric transformer driving circuit for lighting a plurality of cold cathode tubes in parallel.
Figure 13:
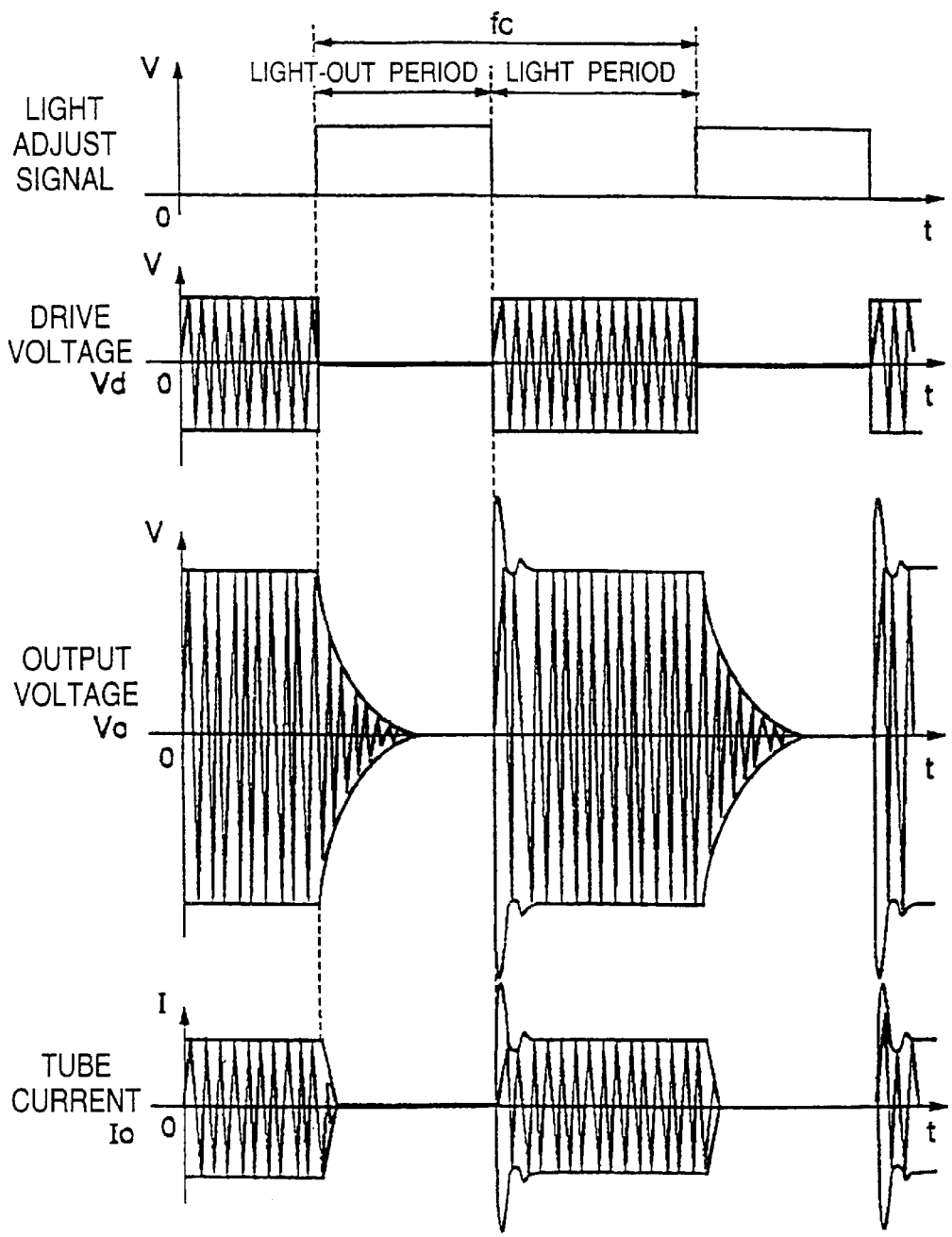
FIG. 13 is a waveform diagram for illustrating the operation of the circuit shown in FIG. 12.
Figure 14A:
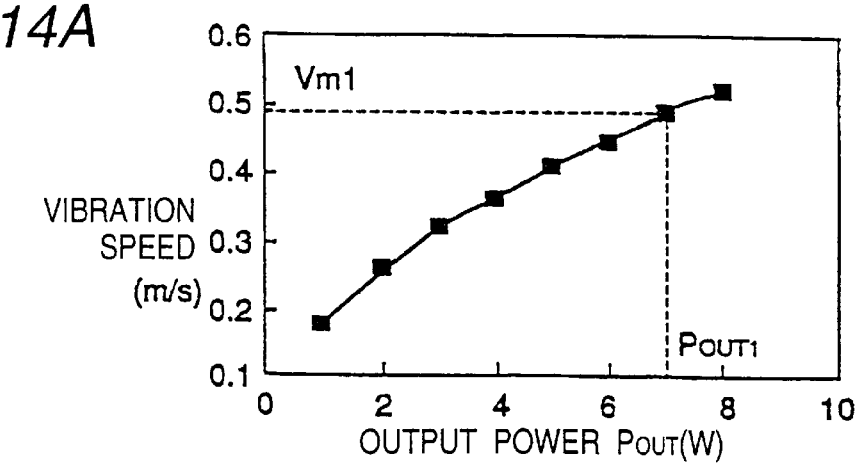
FIG. 14A is a graph illustrating the relation between the output power and the mechanical vibration speed in the piezoelectric transformer.
Figure 14B:
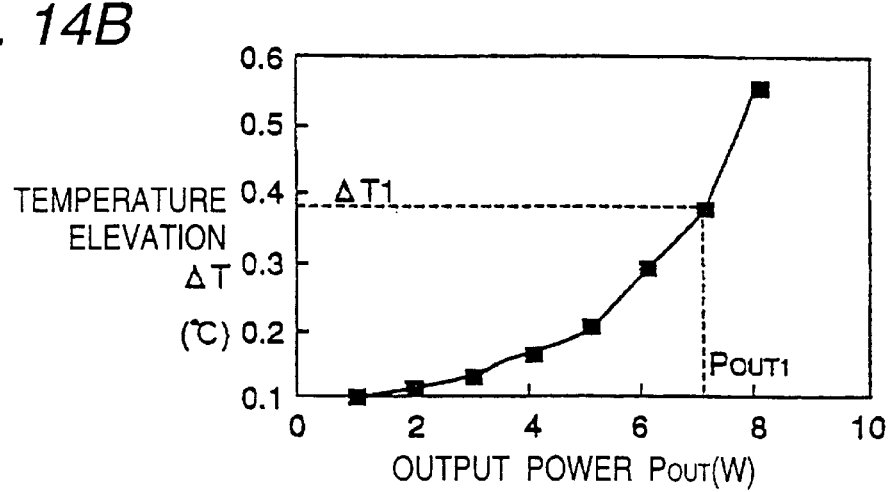
FIG. 14B is a graph illustrating the relation between the output power and the temperature elevation speed in the piezoelectric transformer.
Figure 14C:
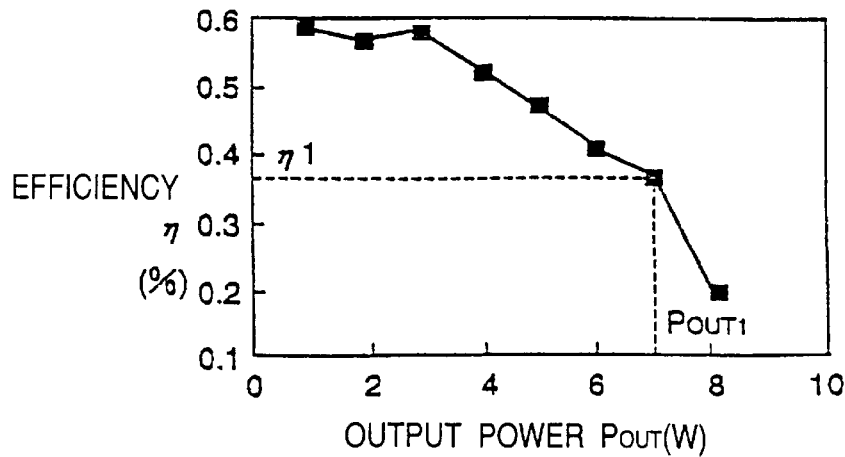
FIG. 14C is a graph illustrating the relation between the output power and the efficiency speed in the piezoelectric transformer.
Figure 15:
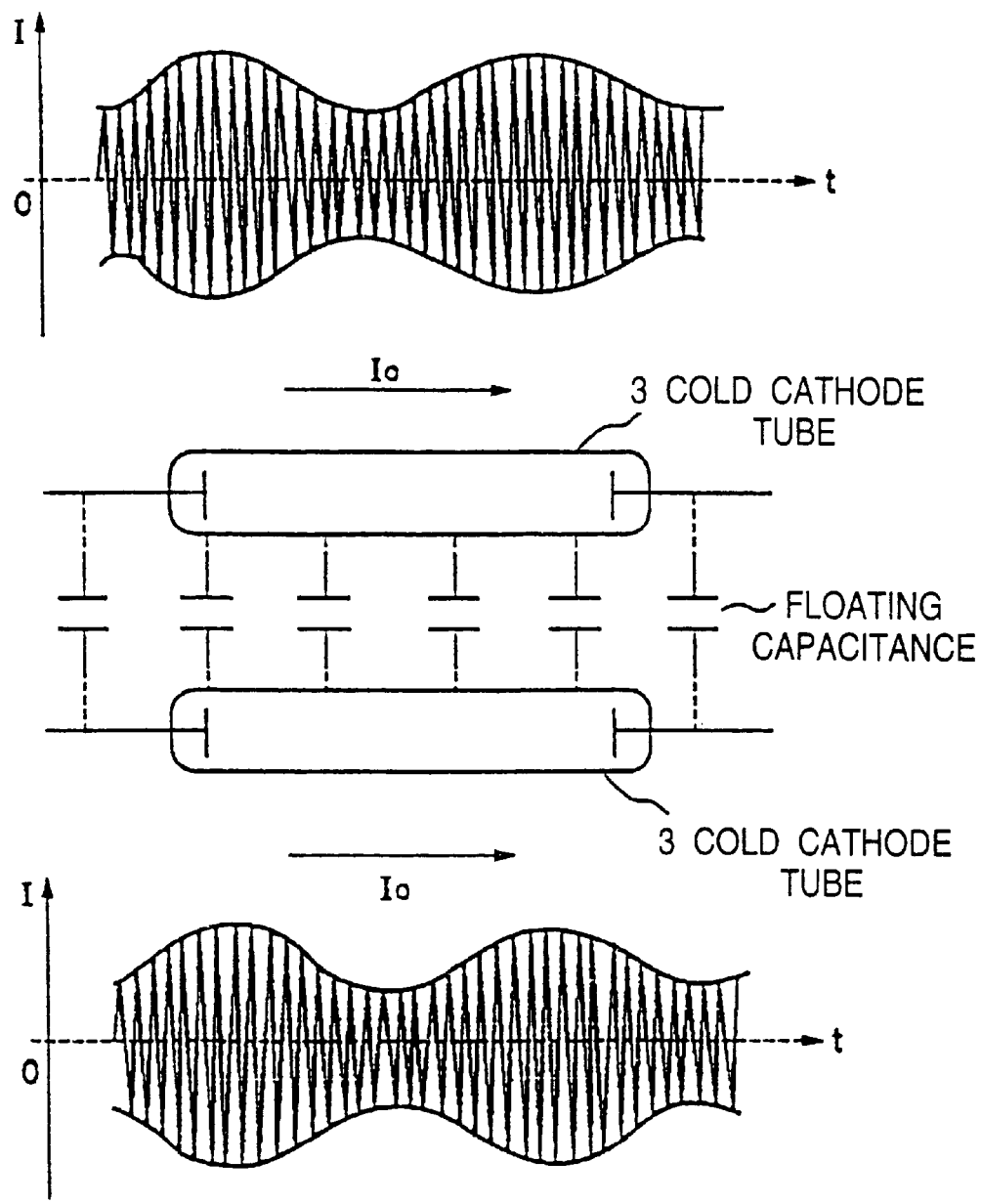
FIG. 15 is a diagram illustrating the mutual interference of floating capacitances between the cold cathode tubes in the circuit shown in FIG. 12.

The light adjusting signal is supplied to the envelope generator 12. An example of an internal circuit of this envelope generator 12 is shown in FIG. 6. This circuit is constituted of switches, constant current sources, and a capacitor. When the light adjusting signal is at the low level, the switch SW3 is turned on and the switch SW4 is turned off, so that the capacitor Cenv is charged from one constant current source. When the light adjusting signal is at the high level, the switch SW3 is turned off and the switch SW4 is turned on, so that the capacitor Cenv is discharged by another constant current source. Therefore, the output of the envelope generator 12 is a trapezoidal wave Venv having ramp portions in time with the rising and the falling of the inverted signal of the light adjusting signal. The trapezoidal wave Venv outputted from the envelope generator 12 is supplied to the first comparator 15 (FIG. 3) of the first drive circuit 7 and the integrator 23 (FIG. 5) of the drive voltage control circuit 11 (FIG. 4). Therefore, when the first and second transistors Q3 is brought from the off condition to the on condition, and when the first and second transistors Q3 is brought from the on condition to the off condition, the duty is gradually increased or decreased, with the result that the half-wave sine wave voltages Vd1 and Vd2 are modulated to have an envelope of the trapezoidal wave. This operation is shown in FIG. 8. As the result of modulating the half-wave sine wave voltages Vd1 and Vd2 to have an envelope of the trapezoidal wave, the harmonic component included in the drive frequency applied to the piezoelectric transformer 2 is restricted, so that a parasite vibration of the piezoelectric transformer 2 can be suppressed, and the generation of the audible sound in the piezoelectric transformer 2 and the support mechanism 10 is reduced. Incidentally, since the output Venv of the envelope generator 12 is supplied to the master block 24 and the slave blocks 25, all the light adjusting periods are in synchronism.

As seen from the above description, the drive circuit for the piezoelectric transformer 2 for efficiently and stably lighting a plurality of cold cathode tubes 3 in parallel, can synchronize the drive frequencies and the light adjusting frequencies, by a combination of one master block 24, one or more slave blocks 25 and one light adjusting block 26, and can also reduce the generation of the audible sound.

Figure 2:
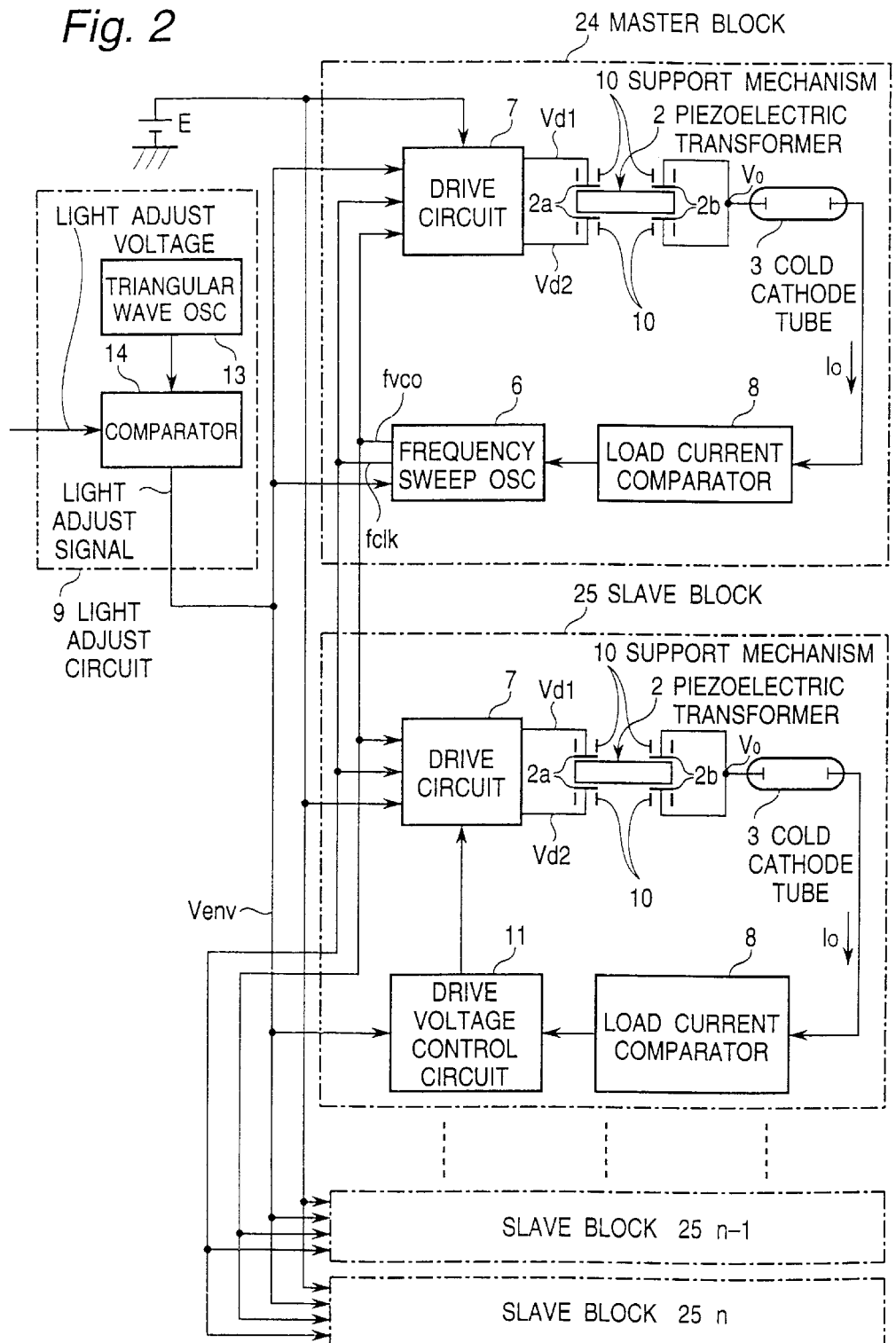
FIG. 2 is a block diagram of another embodiment of the piezoelectric transformer driving circuit in accordance with the present invention.

Next, another embodiment of the present invention will be described. An embodiment shown in FIG. 2 is the same as the embodiment shown in FIG. 1, excepting that the envelope generator 12 shown in FIG. 1 is omitted and the light adjusting signal outputted from the light adjusting circuit 9 is supplied to the drive voltage control circuit 11. This embodiment can be used as the drive circuit for the piezoelectric transformer 2 for efficiently and stably lighting a plurality of cold cathode tubes 3, if the audible sound generated at the time of driving the load does not become a problem.

The present invention as mentioned above has the following various advantages:

A first advantage is that when a plurality of cold cathode tubes 3 are lighted in parallel, the flickering does not occur, because the drive frequencies and the light adjusting frequencies are synchronized. By synchronizing the drive frequencies, it is possible to prevent the amplitude modulation of the tube current caused by the coupling of the floating capacitances. By synchronizing the light adjusting frequencies, the high voltage at the driving starting time and at the driving stopping time of the piezoelectric transformer 2, can no longer change the tube current value of another cold cathode tube through the coupling of the floating capacitances between the cold cathode tubes, and therefore, it is possible to prevent the circuit operation from becoming unstable.

A second advantage is that even if the drive frequencies are synchronized, since all the tube currents are controlled to be maintained at a constant value, the brightness becomes constant. Since there is a variation in the resonance frequency and the step-up characteristics of the piezoelectric transformer and in the voltage-current characteristics of the cold cathode tube 3, even if only the drive frequencies are synchronized, the respective tube currents are different, and therefore, a brightness difference occurs inevitably. In order to absorb this variation, the peak value of the drive voltage for the piezoelectric transformer 2 is controlled to make the tube current constant and therefore to make the brightness constant.

A third advantage is that when plurality of cold cathode tubes 3 having a long tube length are lighted in parallel, it is possible to reduce the generation of the audible sound increased by the PWM light adjustment. Since the drive voltage for the piezoelectric transformer 2 is low, the mechanical vibration speed can be lowered so that the audible sound can be reduced. The harmonic component generated by a time-divided driving and included in the driving frequency for the piezoelectric transformer 2 can be reduced by the envelope generator 12, and therefore, generation of the parasite vibration of the piezoelectric transformer 2 can be reduced. As a result, the audible sound generated in the piezoelectric transformer 2 and its support mechanism can be suppressed.

What is claimed is:

1. An inverter driving method for driving in parallel a plurality of inverters comprising the steps of:
   each of said plurality of inverters
      converting a DC voltage into a first AC voltage,
      outputting, from a secondary side of a step-up device, a drive AC voltage obtained by stepping up said first AC voltage applied to a primary side of said step-up device, said primary side of said step-up device being driven with said first AC voltage; and
      driving one of a plurality of loads in parallel by said drive AC voltage outputted from said secondary side of said step-up device,
   wherein said drive AC voltages outputted from said secondary side of corresponding ones of said step-up devices are controlled at a constant value, and respective drive frequencies of said plurality of inverters are controlled to have the same value.

2. An inverter driving method claimed in claim 1 wherein respective AC currents flowing in said plurality of loads are controlled to have the same value.

3. An inverter driving method claimed in claim 1 wherein each of said loads is constituted of a cold cathode tube.

4. An inverter driving method for driving in parallel a plurality of inverters comprising the steps of:
   each of said plurality of inverters converting a DC voltage in to a first AC voltage,
      outputting, from a secondary side of a step-up device, a drive AC voltage obtained by stepping up said first AC voltage applied to a primary side of said step-up device, said primary side of said step-up device being driven with said first AC voltage, and
      driving one of a plurality of loads in parallel with said drive AC voltage outputted from said secondary side of said step-up device,
   wherein said drive AC voltages outputted from said secondary side of said step-up devices are controlled at a constant value, said drive AC voltages supplied to said plurality of loads are controlled in a pulse width modulation (PWM) manner, and outputting periods of said drive AC voltages outputted from respective step-up devices of said plurality of inverters are controlled to be in the same phase.

5. An inverter driving method claimed in claim 4 wherein respective AC currents flowing in said plurality of loads are controlled to have the same value.

6. An inverter driving method claimed in claim 4 wherein each load is driven by suppressing harmonic components caused by a PWM frequency, included in the first AC voltages supplied to a plurality of said step-up devices.

7. An inverter driving method for driving in parallel a plurality of inverters comprising the steps of:

each of said plurality of inverters converting a DC voltage in to a first AC voltage, outputting, from a secondary side of a step-up device, a drive AC voltage obtained by stepping up said first AC voltage applied to a primary side of said step-up device, said primary side of said step-up device being driven with said first AC voltage, and driving a load by said drive AC voltage outputted from said secondary side of said step-up device, wherein said drive AC voltages outputted from said secondary side of each of said step-up devices are controlled at a constant value, and respective driven frequencies of said plurality of inverters are controlled to have the same value, said drive AC voltages supplied to said loads are controlled in a pulse width modulation (PWM) manner, and outputting periods of said drive AC voltages outputted from respective step-up devices of said plurality of inverters are controlled to be in the same phase.

8. An inverter driving method claimed in claim 7 wherein respective AC currents flowing in a plurality of said loads are controlled to have the same value.

9. A piezoelectric transformer driving method for driving in parallel a plurality of inverters comprising the steps of:

each of said plurality of inverters converting a DC voltage into a first AC voltage, outputting, from a secondary electrode of a piezoelectric transformer, a drive AC voltage obtained by stepping up said first AC voltage applied to a primary electrode of said piezoelectric transformer by means of a piezoelectric effect, said primary electrode of said piezoelectric transformer being driven with said first AC voltage, and applying said drive AC voltage outputted from said secondary electrode of said piezoelectric transformer to a load, changing the driving frequency for said piezoelectric transformer to control a current flowing in said load at a constant value, wherein respective drive frequencies of said inverters are controlled to have the same value.

10. A piezoelectric transformer driving method claimed in claim 9 wherein respective AC currents flowing in a plurality of said loads are controlled to have the same value.

11. A piezoelectric transformer driving method claimed in claim 9 wherein each load is driven by suppressing harmonic components caused by a PWM frequency, included in the first AC voltages supplied to said piezoelectric transformers.

12. A piezoelectric transformer driving method claimed in claim 9 wherein said load is constituted of a cold cathode tube.

13. A piezoelectric transformer driving method for driving in parallel a plurality of inverters comprising the steps of:

each of said plurality of inverters converting a DC voltage into a first AC voltage, outputting, from a secondary electrode of a piezoelectric transformer, a drive AC voltage obtained by stepping up said first AC voltage applied to a primary electrode of said piezoelectric transformer by means of a piezoelectric effect, said primary electrode of said piezoelectric transformer being driven with said first AC voltage, and applying said drive AC voltage outputted from said secondary electrode of said piezoelectric transformer to a load, changing the driving frequency for said piezoelectric transformer to control a current flowing in said load at a constant value, wherein said drive AC voltages supplied to said loads are controlled in a pulse width modulation (PWM) manner, and outputting periods of said drive AC voltages outputted from respective piezoelectric transformers of said plurality of inverters are controlled to be in the same phase.

14. A piezoelectric transformer driving method claimed in claim 13 wherein respective AC currents flowing in a plurality of said loads are controlled to have the same value.

15. A piezoelectric transformer driving method for driving in parallel a plurality of inverters comprising the steps of:

each of said plurality of inverters converting a DC voltage into a first AC voltage, outputting, from a secondary electrode of a piezoelectric transformer, a drive AC voltage obtained by stepping up said first AC voltage applied to a primary electrode of said piezoelectric transformer by means of a piezoelectric effect, said primary electrode of said piezoelectric transformer being driven with said first AC voltage, and applying said drive AC voltage outputted from said secondary electrode of said piezoelectric transformer to a load, changing the driving frequency for said piezoelectric transformer to control a current flowing in said load at a constant value, wherein said drive AC voltages supplied to said loads are controlled in a pulse width modulation (PWM) manner, respective drive frequencies of said inverters are controlled to have the same value, and outputting periods of said drive AC voltages outputted from respective piezoelectric transformers of said inverters are controlled to be in the same phase.

16. A piezoelectric transformer driving method claimed in claim 15 wherein respective AC currents flowing in a plurality of said loads are controlled to have the same value.

17. A piezoelectric transformer driving circuit comprising:

a first inverter including:

a first drive circuit for converting a DC voltage into a first AC voltage, a first piezoelectric transformer outputting, from a secondary electrode of said first piezoelectric transformer, a drive AC voltage obtained by stepping up said first AC voltage applied to a primary electrode of said first piezoelectric transformer by means of a piezoelectric effect, a frequency sweep oscillator for outputting a drive frequency for said first piezoelectric transformer to said first drive circuit, and a first load current comparing circuit for comparing whether a current flowing in a first load connected to said first piezoelectric transformer is larger or smaller than a reference value, the drive frequency of said frequency sweep oscillator being controlled by a control signal outputted from said first load current comparing circuit so as to control the AC current value of said first load at a constant value; and at least one additional inverter including:

a second drive circuit receiving said driven frequency outputted from said frequency sweep oscillator, a second piezoelectric transformer connected to said second drive circuit, a second load current comparing circuit for comparing whether a current flowing in a second load connected to said second piezoelectric transformer is larger or smaller than a reference value, and a drive voltage control circuit for changing the drive voltage for said second piezoelectric transformer, outputted from said second drive circuit, said drive voltage control circuit being controlled by a control signal outputted from said second load current comparing circuit so as to control the AC current value of said second load at a constant value.

18. A piezoelectric transformer driving circuit as claimed in claim 17, further including means for changing the AC currents supplied to said first load and said second load, by on-off controlling in a pulse width modulation (PWM) manner and in the same phase, the respective voltages of said first and second piezoelectric transformers by an output signal of a light adjusting circuit.

19. A piezoelectric transformer driving circuit claimed in claim 17, further including means for controlling respective AC currents flowing in a plurality of said loads to have the same value.

20. A piezoelectric transformer driving circuit claimed in claim 17, further including an envelope generator for modulating an envelope of the driving waveform of the driving voltages for a plurality of said piezoelectric transformers, and means for suppressing a harmonic component of said drive frequencies.

21. A piezoelectric transformer driving circuit claimed in claim 17 wherein each of said first and second loads is constituted of a cold cathode tube.

22. A piezoelectric transformer driving circuit comprising:

at least two inverters connected in parallel, each including:

a drive circuit for converting a DC voltage into a first AC voltage, a piezoelectric transformer outputting, from a secondary electrode of said piezoelectric transformer, a drive AC voltage obtained by stepping up said first AC voltage applied to a primary electrode of said piezoelectric transformer by means of a piezoelectric effect, a frequency sweep oscillator for outputting a drive frequency for said piezoelectric transformer to said drive circuit, a load current comparing circuit for comparing whether a current flowing in a load connected to said piezoelectric transformer is larger or smaller than a reference value, the drive frequency of said frequency sweep oscillator being controlled by a control signal outputted from said load current comparing circuit so as to control the AC current value of said load at a constant value, wherein the AC currents supplied to a first load and a second load are changed by on-off controlling in a pulse width modulation(PWM) manner and in the same phase, the respective drive voltages of a plurality of said piezoelectric transformers by an output signal of a light adjusting circuit.

23. A piezoelectric transformer driving circuit claimed in claim 22, further including means for controlling respective AC currents flowing in a plurality of said loads to have the same value.

24. A piezoelectric transformer driving circuit claimed in claim 22, further including an envelope generator for modulating an envelope of the driving waveform of the driving voltages for a plurality of said piezoelectric transformers, and means for suppressing a harmonic component of said drive frequencies.

* * * * *